United States Patent

Cheng

[11] Patent Number: 6,079,063
[45] Date of Patent: Jun. 27, 2000

[54] CASTERS OF A COLLAPSIBLE CRIB

[75] Inventor: Ying-Hsiung Cheng, Tainan Hsien, Taiwan

[73] Assignee: Pao-Hsien Cheng, Tainan Hsien, Taiwan

[21] Appl. No.: 09/167,586

[22] Filed: Oct. 7, 1998

[30] Foreign Application Priority Data

Feb. 12, 1998 [TW] Taiwan ................................. 87201998

[51] Int. Cl.$^7$ .............................. B60B 33/00; A47D 7/00
[52] U.S. Cl. ..................................... 5/98.1; 16/32
[58] Field of Search ........................... 5/98.1, 98.2, 99.1; 16/32, 44; 312/351.11, 351.12, 351.13

[56] References Cited

U.S. PATENT DOCUMENTS

| | | | |
|---|---|---|---|
| 3,064,277 | 11/1962 | Gill | 5/98.1 |
| 3,474,472 | 10/1969 | Hamilton, II | 5/98.1 |
| 4,974,284 | 12/1990 | Campbell | 16/30 |
| 5,259,088 | 11/1993 | Yang | 16/44 |
| 5,586,345 | 12/1996 | Nielsen et al. | 5/98.1 |
| 5,586,803 | 12/1996 | Overpeck | 16/40 |
| 5,615,427 | 4/1997 | Huang | 5/98.1 |

*Primary Examiner*—Chuck Y. Mah
*Assistant Examiner*—Donald M. Gurley
*Attorney, Agent, or Firm*—Rosenberg, Klein & Lee

[57] ABSTRACT

A caster of a collapsible crib includes a wheel and an outer cover fixed to the bottom of the crib. The wheel is rotatably housed within the outer cover. The outer cover has a supporting block, which is arranged such that the wheel is a distance from the ground when the crib is held upright on the ground, i.e. the supporting block touches the ground instead of the wheel.

The crib is provided with two above described casters and two supporting base members so that it can be normally supported upright with four points; while the crib, when collapsed, can be leant on a user hand so that it is supported with only wheels of the casters to be capable of moving erasily.

1 Claim, 6 Drawing Sheets

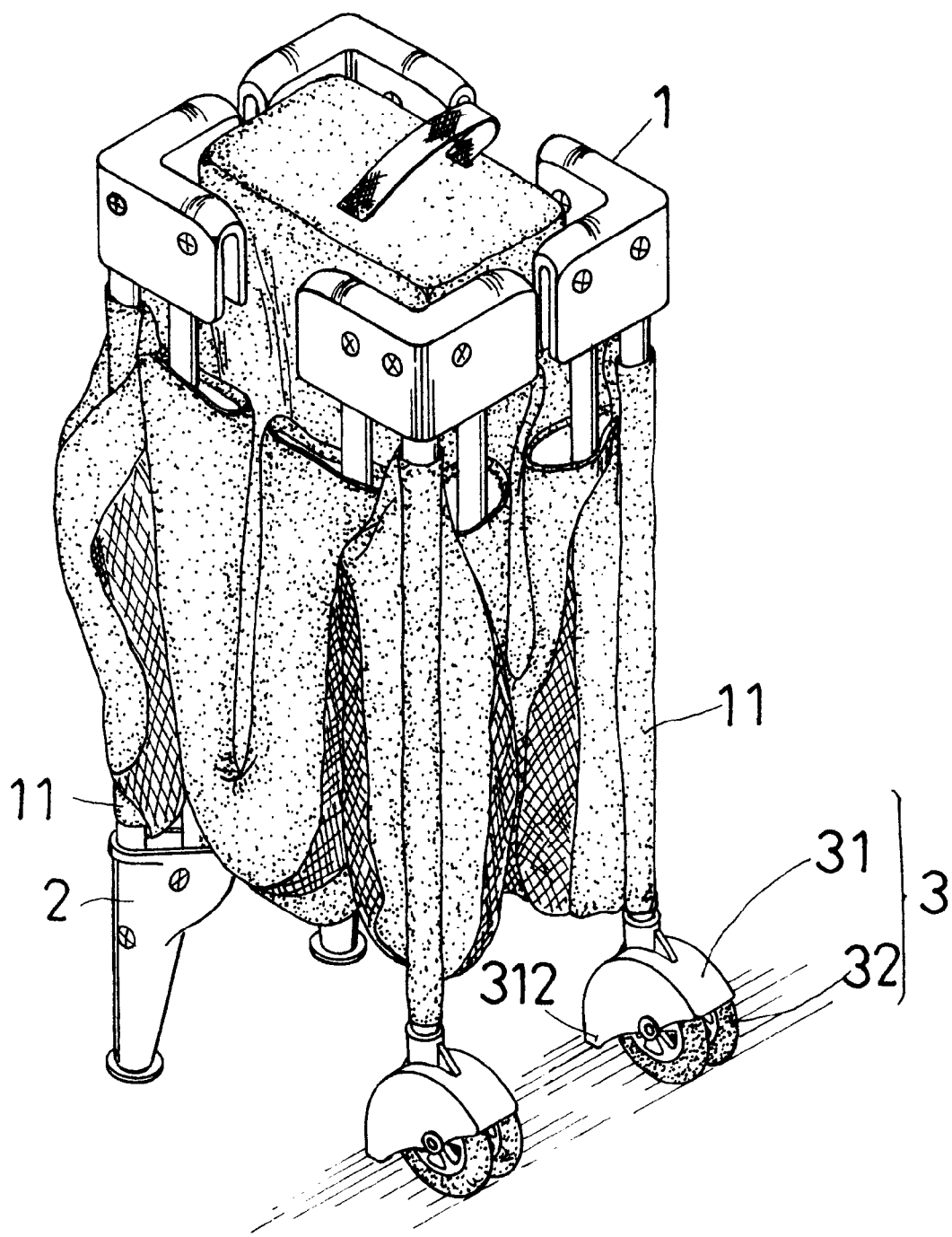
F I G .1

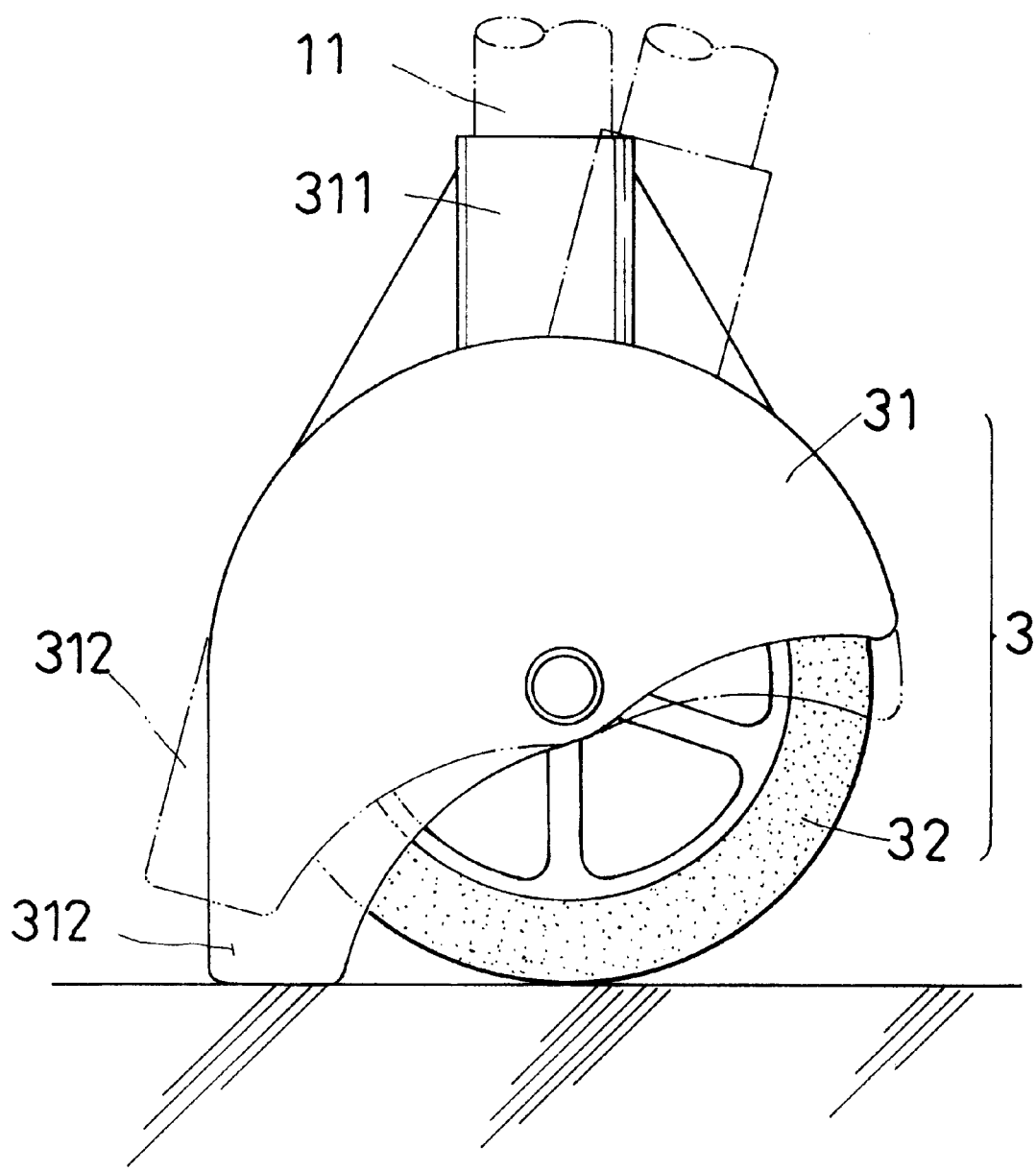
F I G. 2

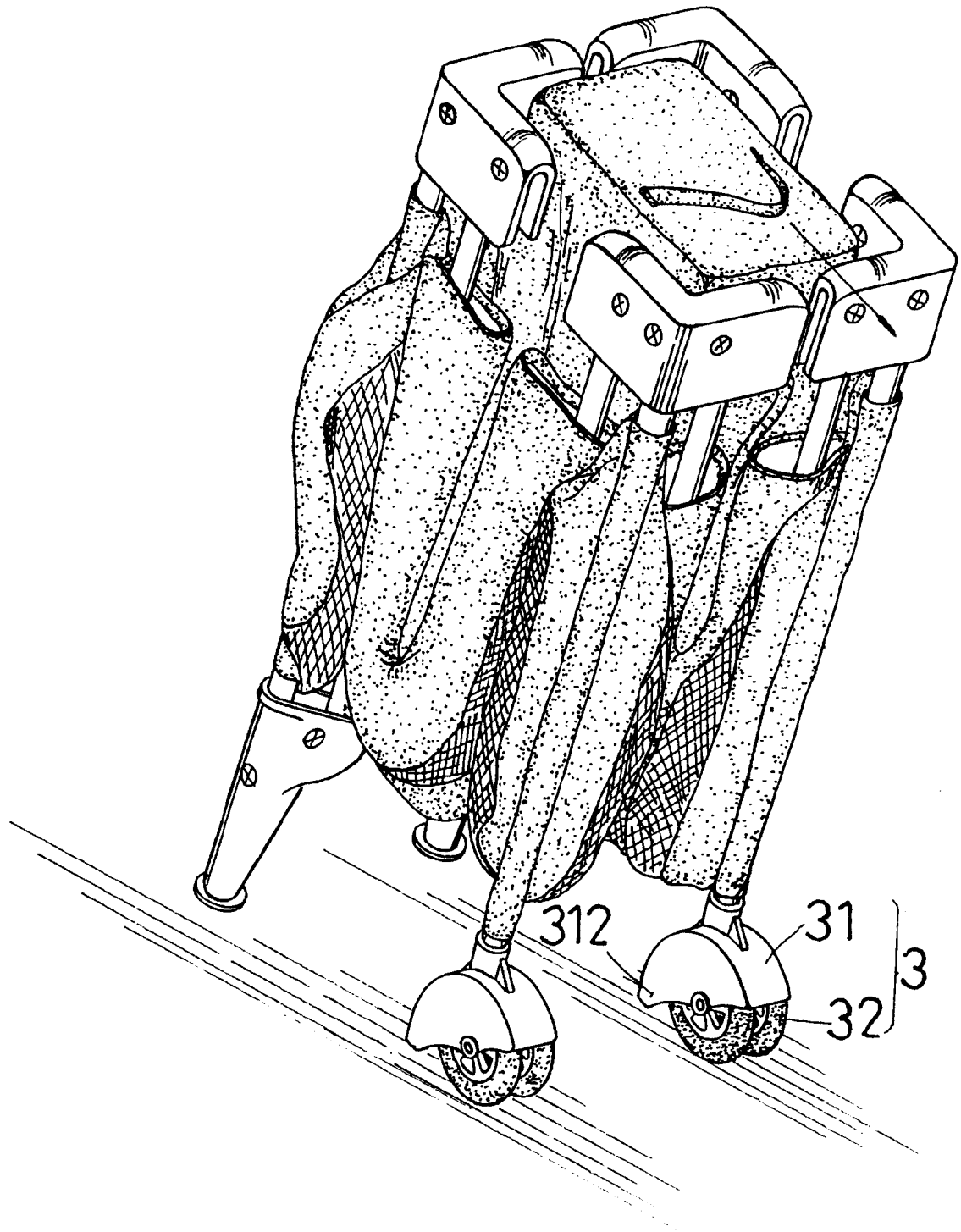
F I G. 3

CASTERS OF A COLLAPSIBLE CRIB

BACKGROUND OF THE INVENTION

The present invention relates to a caster of a collapsible crib. Collapsible cribs with various structures have been deviced to permit cribs, which are provided for a baby or young child to lie therein, and have bars or nets on four sides to keep the baby or young child from falling out, to be capable of being collapsed to a smaller one for convenient storage and transportation.

Moreover, the above mentioned collapsible cribs are provided with casters, which are fixed to the bottom of the cribs, so that the cribs, when collapsed, can be moved still more easily by means of the casters.

Heretofore known casters of a collapsible crib, referring to FIGS. 4, 5 and 6, is provided; the collapsible crib comprises a main body 10, four supporting rods 101, and two supporting base members 102 each fixed to a respective one of two of the supporting rods 101; the casters are denoted with numerals 20, and each comprises a top cover 30, a wheel 40, a finger member, 50, and an engaging rod 60 as the main parts. The top cover 30 is provided with a connecting tube member 301, which connecting tube member 301 is connected to the supporting rod 101 to fix the caster 20 to the supporting rod 101 of the collapsible crib. Furthermore, each wheel 40 is provided with a plurality of radially disposed engaging protrusions 401.

Referring to FIGS. 5 and 6, the finger member 50 is passed through, the top cover 30 at one end and is pivoted on the top cover 30; moreover, the engaging rod 60 is connected to the finger member 50. When a user wants to prevent the wheel 40 from rotating, he presses the finger member 50 inwardly such that the engaging rod 60 is retained within two adjacent engaging protrusions 401, making the wheel 40 not capable of rotating; thus, the user can prevent the crib from being accidentally moved. However, it is found that the above described cribs have the following disadvantages:

1. The caster have too many parts.
2. The assembling of casters is relatively complicated and time-consuming.
3. Consequently, the cost of materials and labor are relatively high.

SUMMARY

A caster of a collapsible crib of the present invention is devised to provide the collapsible crib with a stable support while the crib is placed upright on the ground, and also to provide the same with a portability when the crib is collapsed.

The caster includes a wheel and an outer cover fixed to the bottom of the crib. The outer cover has a supporting block which is arranged and shaped such that the wheel is a distance from the ground when the crib is held upright on the ground, i.e. the supporting block touches the ground instead of the wheel.

The crib is provided with two above mentioned casters and two supporting base members so that it can be normally supported upright with four points. On the other hand, the crib, when collapsed, can be leant on a user hand so that it is supported with only wheels of the two casters to be capable of moving easily.

BRIEF DESCRIPTION OF THE DRAWINGS

The present invention will be better understood with reference to the accompanying drawings, wherein:

FIG. 1 is a view showing a collapsible crib, collapsed and placed upright on the ground, with the caster of the present invention;

FIG. 2 is a view showing the caster of the present invention;

FIG. 3 is a view showing the collapsible crib, collapsed and supported only with the casters of the present invention;

DETAILED DESCRIPTION OF THE PREFERRED EMBODIMENTS

Figure 4:
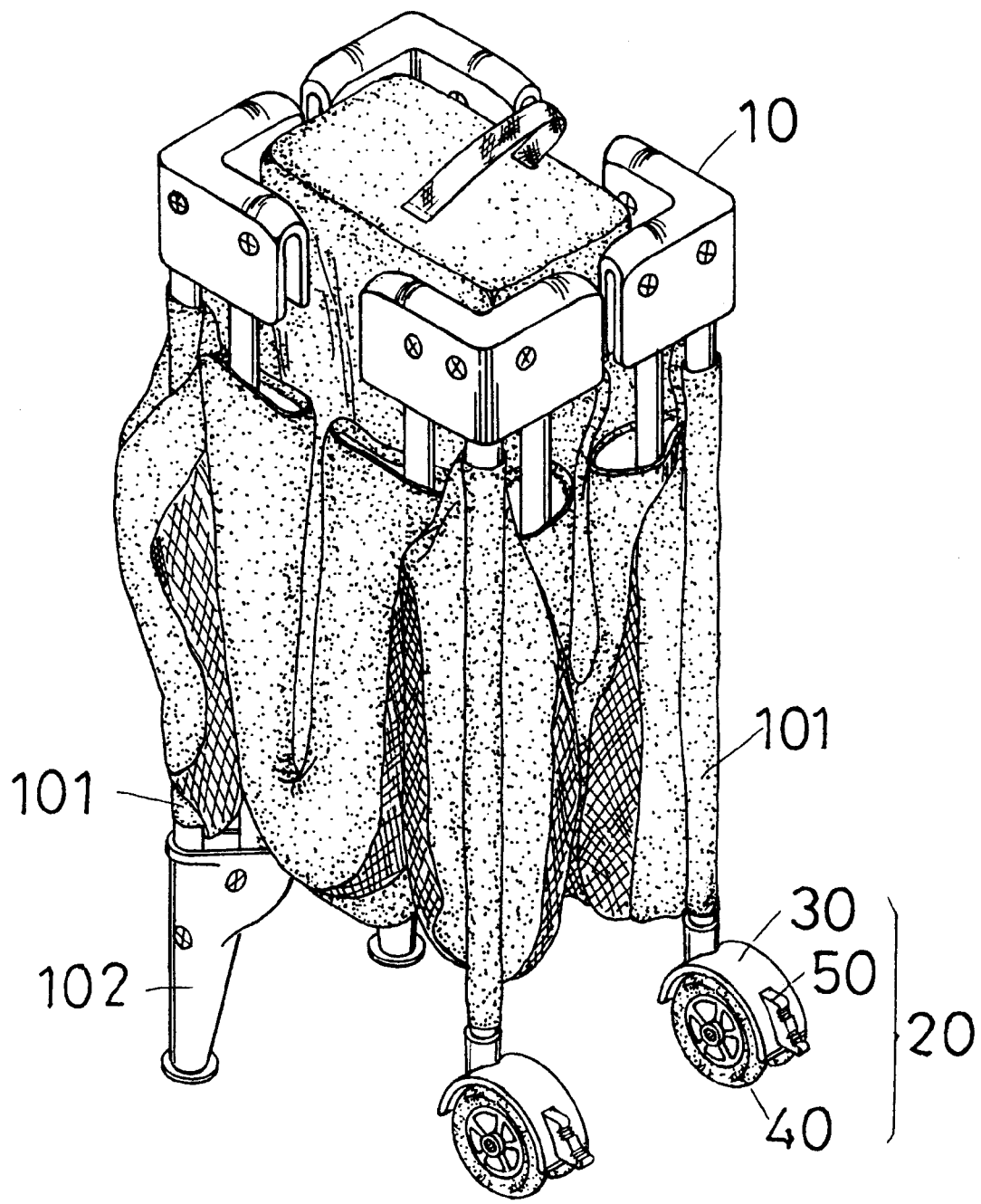
FIG. 4 is view of a collapsible crib, collapsed and placed upright on the ground, with prior art casters as described in the background.
Figure 5:
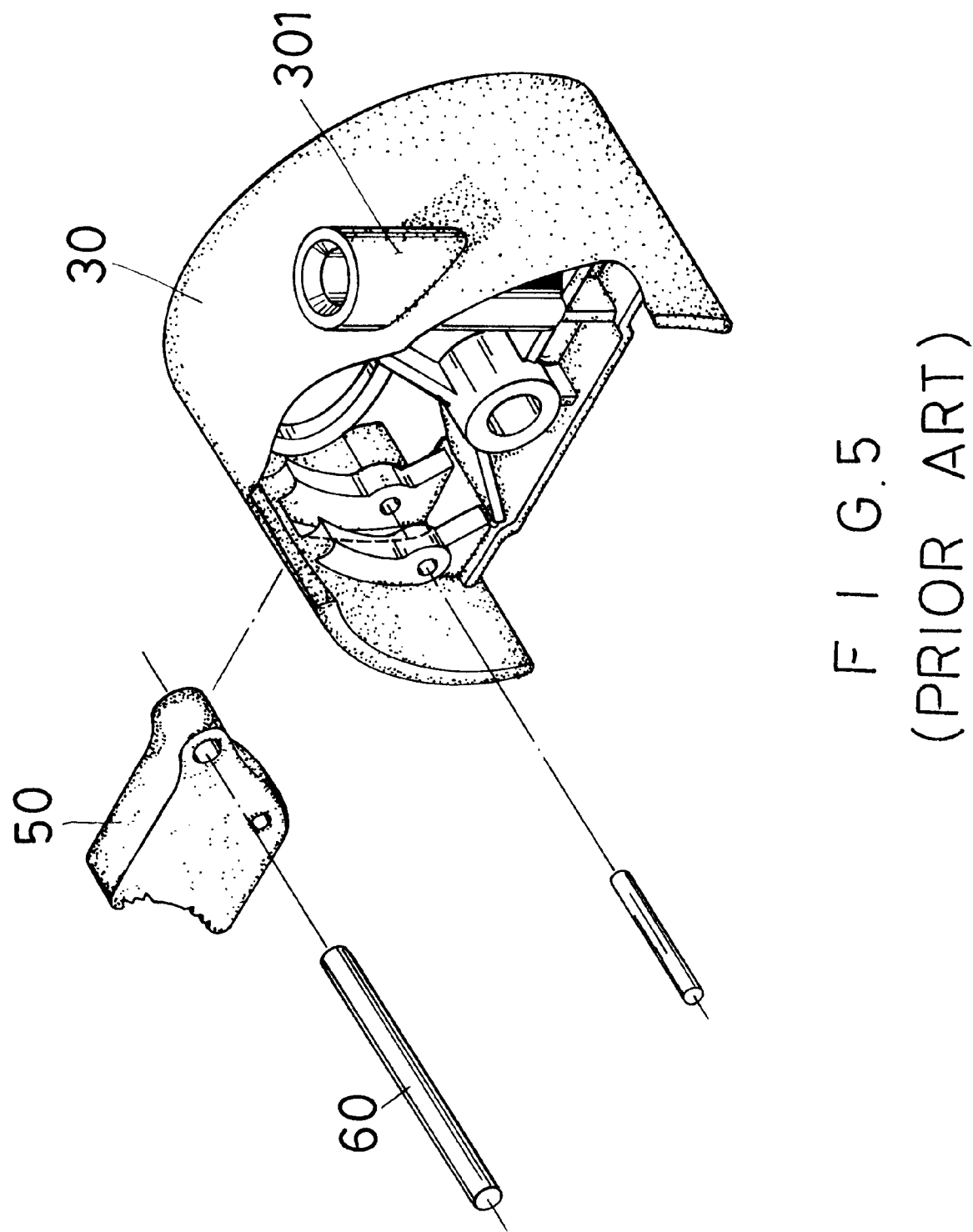
FIG. 5 is a fragmentary exploded view of a prior art caster as described in the background; and, FIG. 6 is a sectional view of a prior art caster as described in the background.
Figure 6:
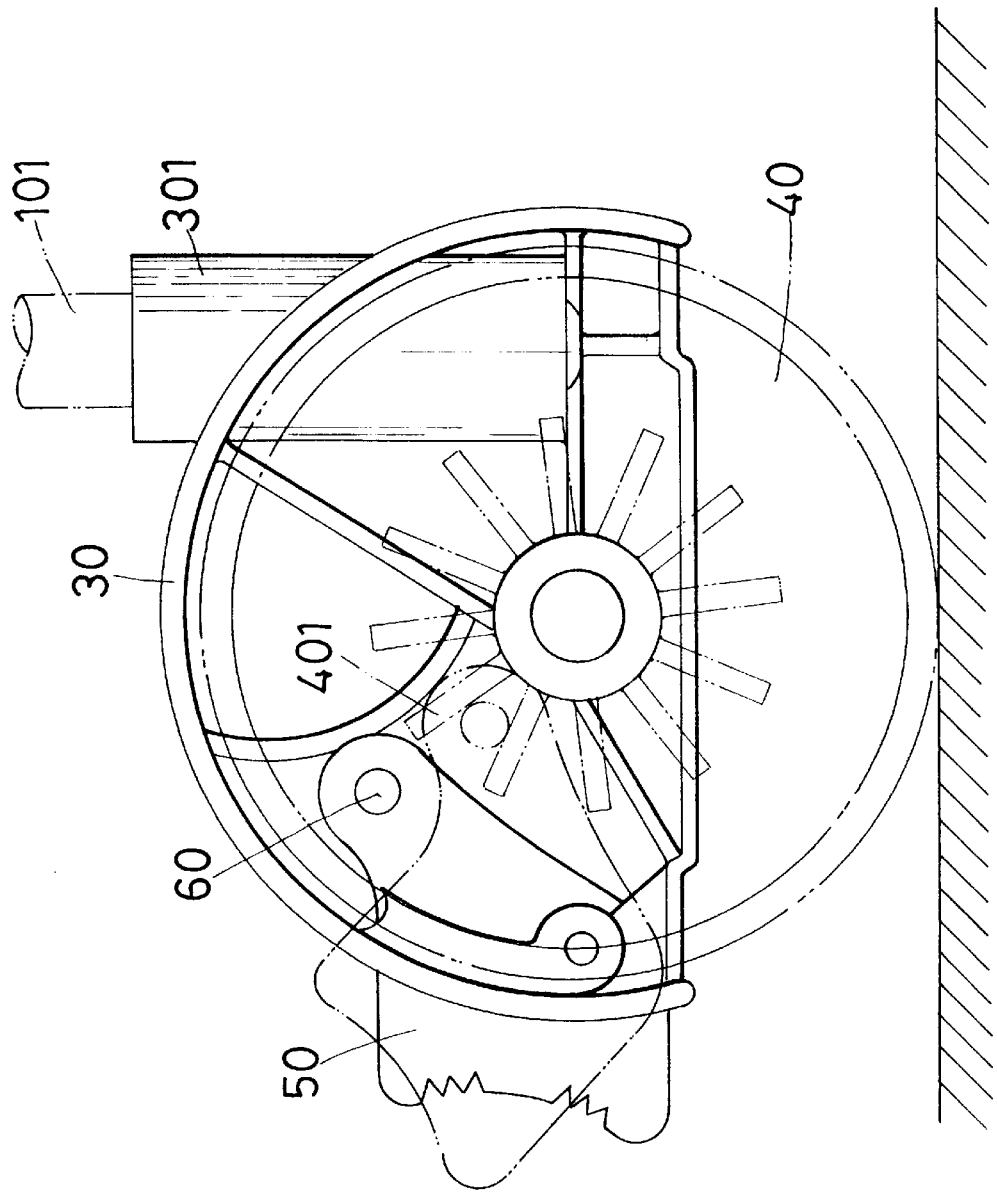

Casters of a collapsible crib in the present invention, referring to FIGS. 1 and 2, is provided; the collapsible crib comprises a main body 1, four supporting rods 11 connected to the main body 1, and two supporting base members 2 each fixed to a respective one of two of the supporting rods 11 as shown in FIG. 1; the casters are each denoted with numeral 3 and each comprises an outer cover 31, a wheel 32, which is rotatable within the outer cover.

Moreover, the outer covers 31 are each provided with a connecting tube member 311 at upper side thereof, while tube member 311 is connected to a respective one of the other two supporting rods 11 to fix the casters 3 to bottom portion of the collapsible crib. Each of the outer covers 31 is further provided with supporting block 312 substantially disposed at lower portion thereof, which is arranged and shaped such that the wheels 32 are a distance from the ground, when the collapsible crib is supported with the supporting base members 2 along with the caster 3; i.e. the supporting block 312 touches the ground instead of the wheels; thus, the crib is supported with the supporting base members 2, plus the supporting block 312, greatly increasing the stability of the crib, preventing the crib from being accidentally moved because the wheels 32 do not touch the ground.

On the other hand, when the user collapses the crib and wants to move the same, he can simply lean the crib on his hands, as shown in FIG. 3, to make the wheels 32 touches the ground; thus, the collapsed crib can be easily moved by means of the casters 3.

From the above descriptions, it can be understood that the casters of a collapsible crib in the present invention have the following advantages.

1. The components of the casters are very simple.
2. The components can be easily assembled together.
3. Consequently, the materials and labor cost are relatively low.

What is claimed is:

1. A caster of a collapsible crib, comprising a wheel, and an outer cover having a connecting tube member at upper side thereof, and a supporting block at lower portion of said outer cover, said wheel being rotatable within said outer cover, said connecting tube member being connected to one of four supporting rods of the crib, which are connected to four corners of a main body of the crib, said supporting block being arranged such that said wheel being a distance from a ground where said crib is placed when said crib is supported with said four supporting rods, said wheel being capable of touching the ground when said collapsible crib, when collapsed and leant on a user's hand, for permitting said collapsed crib to be moved.

* * * * *